(12) United States Patent
Hardigg

(10) Patent No.: US 6,210,829 B1
(45) Date of Patent: Apr. 3, 2001

(54) CHEVRON SHAPED BATTERY JAR BRIDGES

(75) Inventor: James S. Hardigg, Conway, MA (US)

(73) Assignee: Harding Industries, Inc., South Deerfield, MA (US)

( * ) Notice: Subject to any disclaimer, the term of this patent is extended or adjusted under 35 U.S.C. 154(b) by 0 days.

(21) Appl. No.: 09/364,316

(22) Filed: Jul. 30, 1999

(51) Int. Cl.[7] ....................................... H01M 2/00
(52) U.S. Cl. ..................... 429/163; 429/167; 429/176; 429/186; 29/623.1
(58) Field of Search ................................ 429/163, 167, 429/176, 186; 29/623.1

(56) References Cited

U.S. PATENT DOCUMENTS 1,296,961 * 3/1919 Irwin .
3,661,646 * 5/1972 Barrett, Jr. ............................ 136/79

* cited by examiner

*Primary Examiner*—Stephen Kalafut
*Assistant Examiner*—Angela J. Martin
(74) *Attorney, Agent, or Firm*—McCormick, Paulding & Huber LLP

(57) ABSTRACT

A battery jar for a battery cell having a plurality of plate support bridges, preferably chevron shaped, is presented. The bridges are disposed on a bottom surface of the battery jar. The bridges include a pair of legs attached at an angle such that each leg provides structural support for each other when supporting the plates of the battery cell. Advantageously, the invention provides good resistance to columnar buckling from impact loads of the plates without requiring that the bridges be made thick relative to prior art bridges. Therefore, migration of the residue from the plates (mud) is enhanced. Also, the invention reduces the indentation depth required over the prior art by providing dual bearing surfaces for the plates.

29 Claims, 4 Drawing Sheets

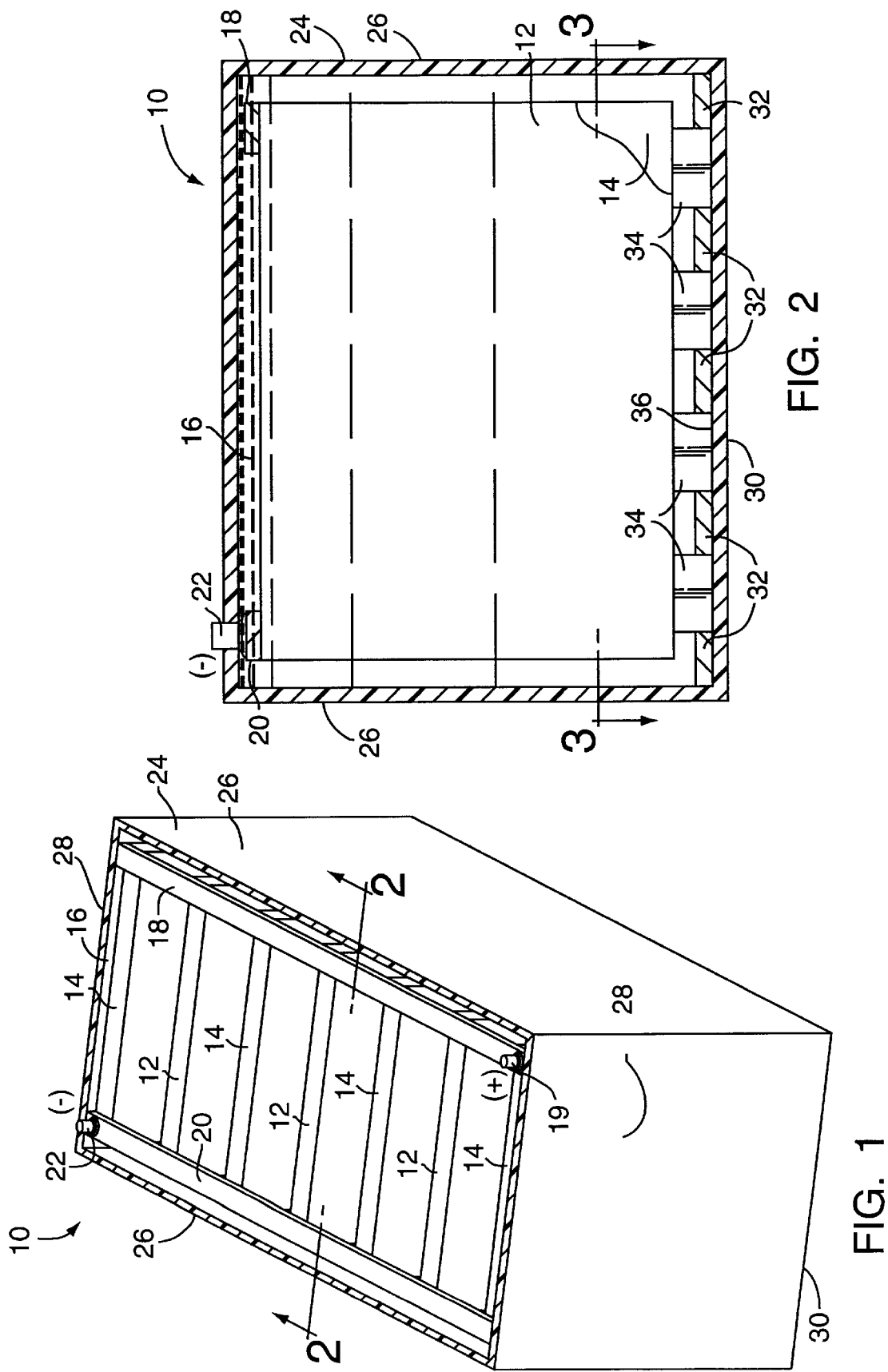

CHEVRON SHAPED BATTERY JAR BRIDGES

FIELD OF THE INVENTION

The present invention relates generally to an electric battery. More specifically, the present invention relates to chevron shaped bridges for a battery jar.

BACKGROUND OF THE INVENTION

Battery jars, i.e., battery cell containers, typically house a single battery cell of a multi-cell flooded lead-acid battery. Each battery cell comprises a set of at least two lead plates immersed in an acid electrolyte. The plates are arranged in parallel relation and have alternate positive and negative charges. Generally, a pair of lead bars mechanically and electrically connect the upper ends of the positive and negative plates together respectively.

Because the electric batteries depend on chemical reactions between ions carried by the plates and the electrolyte to produce electrical power, it is normal for some by-products of these reactions, e.g., lead sulfate, to become dislodged and settle to the bottom as residue. If sufficient residue (mud) settles, a conductive ridge may buildup and short-circuit the battery.

In order to prevent shorting between the plates as material flakes off, supports (bridges) are required to raise the bottom of the plates above the floor of the battery jars. The amount of mud that can be accommodated by a bridge structure depends on the height of the bridge and on lateral passages through the bridge structure to allow the mud to spread out. Ideally, the bridge should allow the mud to spread uniformly over the entire bottom of the jar. This results in the least bridge height required to accommodate the amount of mud expected during the life of the battery. By minimizing bridge height, the electrical storage capacity for a particular size of battery cell is maximized.

It is also necessary that mud does not accumulate on top of the bridges. Consequently, the tops of the bridge members are made as narrow as practicable, taking into account the compressive strength of both the lead in the plates and the material used in the bridges. The tops of the bridge members are rounded to minimize the accumulation of mud while providing bearing area. For motive-power cells using polypropylene bridges, the radius at the crest of the bridge members is typically 0.040 inches to 0.080 inches. The sides of the bridge members are made steep so that mud will slip off them.

A bridge may either be integrally molded into a jar or molded as a separate piece and inserted into a jar. Separately-molded bridges can be made with ample lateral passages for the migration of mud. Also, separately-molded bridges, although more expensive, enable a battery manufacturer to make cells having different capacities by using bridges of different heights in one size of jar.

Some prior art molded-in bridges have been in the form of bars which run perpendicular to the width of the plates. By way of example, lead acid motive-power cells, e.g., forklift batteries, typically use bridges with either two, three or four bars supporting the plates. However, the bars form a plurality of enclosed areas which block the flow of electrolyte and, therefore, prevent mud from being able to migrate from one area to the next.

Another prior art design, which allows residue to migrate more completely, is disclosed in U.S. Pat. No. 3,338,452 (Oakley). Oakley discloses bridge members comprising a plurality of ribs that are disposed on the inner surface of the bottom portion of the battery jar. The ribs are formed integrally with the bottom. They are disposed in mutually parallel sets at an angle to the wall of the jar.

A flooded lead-acid battery cell normally sits upright at all times. Thus, the weight of each plate is supported by upward force exerted on the area of contact between the bottom edge of the plate and the crest of the bridge structure. The contact force between a plate and the crest of the bridge does not result in much deformation of the bottom edge of the plate or the crest of the bridge under static conditions. However, a battery may undergo impacts and vibratory forces on its bottom during handling and shipping. Also, in its normal service, a battery used in an automotive vehicle is subjected to vibration and impacts due to irregularities in the surfaces over which it travels. As a result, the peak contact force between the bottom edge of a plate and the crest of the bridge may be many times greater than the static force. The crests of the bridge members will indent until the bearing surfaces in contact with the bottom of the plates are large enough to withstand the impacts without further deformation.

It is desirable that the bridge support members be slender, preferably no thicker than the bottom wall of the jar. If they are thicker than the bottom of the jar, molding time for integrally molded bridges will be lengthened. Thick bridge members also reduce the space available for mud for a particular bridge height.

In motive-power lead-acid batteries, bridge heights typically range from 0.5 inches to 1.5 inches. Problematically, however, bridge members, e.g., bar shaped or a plurality of ribs as disclosed in Oakley, whose height to thickness ratio exceeds about 6 to 1 may buckle during severe impacts to the bottom of the cell. The higher bridge members need to be configured to resist columnar buckling.

There is a need, therefore, for improved battery jar bridges to provide improved bottom support to lead plates of a battery cell.

BRIEF SUMMARY OF THE INVENTION

This invention offers advantages and alternatives over the prior art by providing a battery jar with a plurality of plate support bridges, preferably chevron shaped, disposed on a bottom surface of the battery jar. The bridges include a pair of legs attached at an angle such that each leg provides structural support for the other when supporting the plates. Advantageously, the invention provides good resistance to columnar buckling without requiring that the bridges be made thick relative to prior art bridges. Therefore, migration of the residue from the plates is enhanced. Also, the invention reduces the indentation depth required over the prior art to provide a bearing surface area large enough to withstand impact from the plates with little deformation.

These and other advantages are accomplished in an exemplary embodiment of the invention by providing a battery jar for receiving a plurality of alternately charged positive and negative plates immersed in an electrolyte. The battery jar comprises a bottom portion having an inside surface. A plurality of walls extend upwardly from the periphery of the bottom portion. A plurality of plate support bridges are disposed on the inside surface of the bottom portion to support the plurality of plates a predetermined distance above the inside surface. The bridges include a pair of legs attached at an angle such that each leg provides structural support for the other when supporting the plates.

Additionally, in this exemplary embodiment, the pair of legs further comprise dual bearing surfaces for the plates.

BRIEF DESCRIPTION OF THE DRAWINGS

Referring now to the drawings, wherein like elements are numbered alike in the several Figures:

FIG. 1 is a perspective view of a battery cell in accordance with the invention;

FIG. 2 is a cross-sectional view of FIG. 1 taken along the line 2—2;

DETAILED DESCRIPTION OF THE INVENTION

Figure 3:
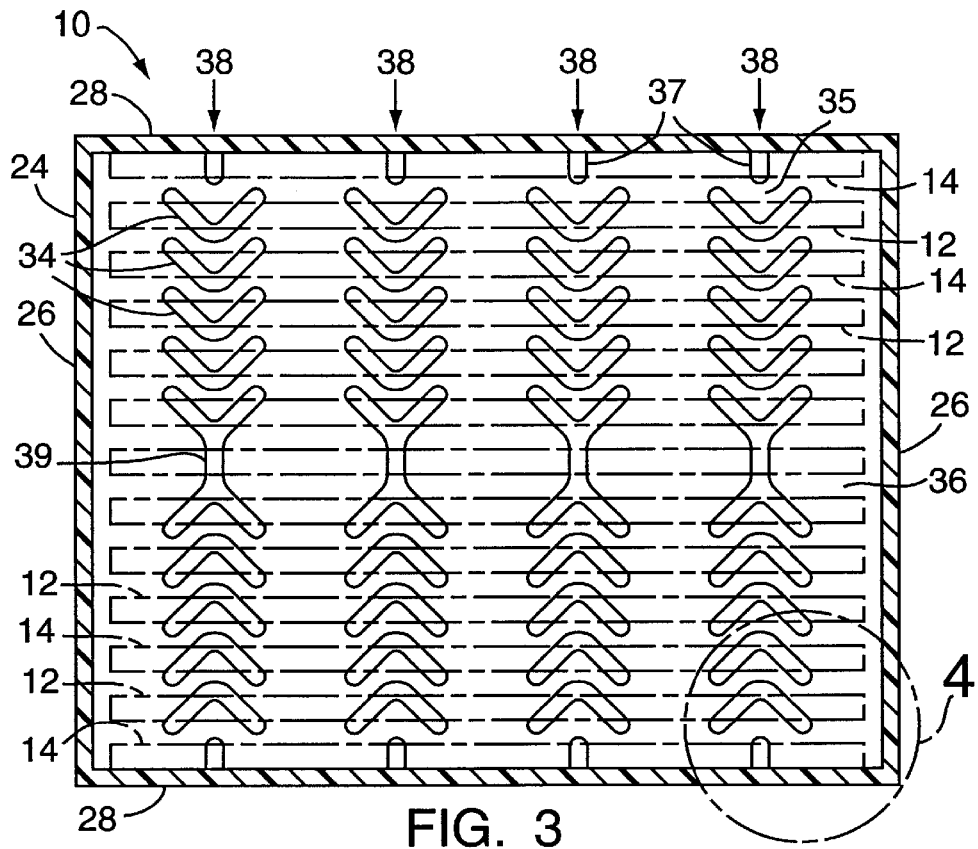
FIG. 3 is a cross-sectional view of FIG. 2 taken along the line 3—3.

Referring to FIG. 1, an exemplary embodiment of a flooded lead acid battery cell, in accordance with the present invention, is shown generally at 10. Battery cell 10 comprises a plurality of alternately charged positive 12 and negative 14 plates immersed in an acid electrolyte 16. The positive plates are welded at their tops to a lead bar 18 (termed "positive strap") which also supports the positive terminal post 19 for the cell. Similarly, the tops of the negative plates are welded to a second lead bar 20 (negative strap), from which rises the negative terminal post 22. Battery jar 24 encloses the battery cell 10 with a plurality of walls 26 and 28 which extend upwardly from a periphery of a bottom portion 30 of the battery jar.

Referring to FIG. 2, a cross-sectional view of FIG. 1 taken along the line 2—2 is shown. During normal operation of the battery cell 10, the electrolyte 16 and the plates 12 and 14 chemically react to produce electric power. It is normal for by-products of these reactions, e.g., lead sulfate, to become dislodged and settle to the bottom as residue 32. If sufficient residue (mud) settles, a conductive bridge may buildup and short the positive and negative plates together. Therefore, a plurality of angled plate support bridges 34 are disposed on an inside surface 36 of the bottom portion 30 of the battery jar 24. The plate support bridges 34 support the positive and negative plates 12 and 14 and maintain them a predetermined distance above the inside surface 36 to allow even migration of the residue 32.

Referring to FIG. 3, a cross-sectional view of FIG. 2 taken along the line 3—3 is shown. The plurality of angled plate support bridges 34 are generally chevron shaped (v-shaped) and are disposed in parallel rows 38 along the inside surface 36 of bottom portion 30. In this embodiment, the bridges are constructed of a thermoplastic, e.g., polypropylene, and are integrally molded into the bottom portion 30 of the battery jar 24. However, one skilled in the art will recognize that the bridges 34 may be assembled separately from the battery jar 24 and disposed therein. The plurality of plates are also arranged in parallel and run perpendicular to the rows 38 of the bridges. The rows of molded-in bridges 38 fully support the battery plates 12 and 14 and provide passages for mud to spread over the entire bottom of the battery jar 24. Though this embodiment shows the chevron shaped bridges arranged in a 4-row version, it will be clear to one skilled in the art that other arrange-ments may also be used, e.g., a 2-row version.

In the flooded lead-acid battery cell 10, the plates 12 and 14 are typically assembled, i.e., stacked together, such that the outside plates 14 of the stack are negative; they typically range in thickness from 0.15 to 0.19 inches. In the battery jar 24, a straight bridge 37 is advantageously attached to the end walls 28 of the jar 24 for support of the first and last negative plates 14. The length of the straight bridge 37 is made a little greater than the thickness of the first plate 14 so that it can continue to support the plate during impacts which might cause the plate to temporarily lose contact with the jar wall 28.

The next plate 12, which is positive, is supported by the first chevron 34 whose concave side, i.e., the side with less than a 180° angle, faces the straight bridge 37. The space 35 between the inner end of the straight bridge 37 and the first chevron 34 allows the passage of mud.

The positive plates 12 are typically 0.24 to 0.29 inches thick, but they have wrappings (not shown) which cause them to occupy about 0.56 inches of thickness. The chevrons 34 beneath the plates 12 and 14 are located so that the centers of the bearing areas on the chevron 34 are aligned with the centers of the plates. The chevrons 34 for both the positive 12 and the negative 14 plates provide for some lateral motion of the plates along the length of the chevron row 38 during lateral impacts to the cell.

It is preferable that the chevron row 38 be made symmetrical about the center of the jar using a short straight center-bar 39 to support the center negative plate 14. This chevron configuration provides mud passages around both ends of the chevron row 38. Although mud is blocked by the center short straight-bar 39 from passing directly through the row of chevrons, it can move along the row and then pass through the open passages.

Figure 4:
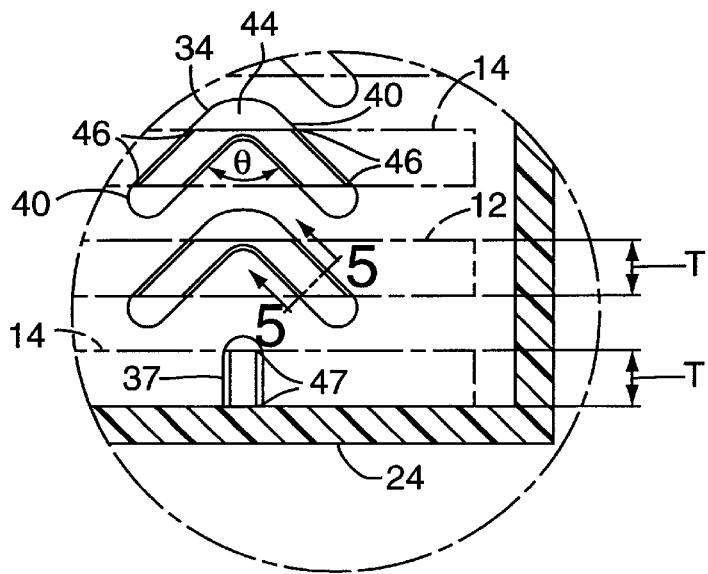
FIG. 4 is an expanded view of the area 4—4 of FIG. 3.

Referring to FIG. 4, an expanded view of the area 4—4 of FIG. 3 is shown. The bridges 34 include a pair of legs 40 which are attached at an included angle $\theta$, e.g., substantially 90°, such that each leg 40 provides structural support for the other when supporting the plates 12 and 14. The chevron shape provides good resistance to columnar buckling without making the walls thick relative to prior art bridges, which would lengthen molding time. Though this embodiment shows the legs 40 attached at substantially a 90° included angle, one skilled in the art will recognize that other angles may also be used.

The top surface of the bridges 34 forms a rounded crest 44 upon which the plates are supported. Dual bearing surfaces 46 on each leg 40 make contact with the plates 12 and 14 and bear the weight thereof. As a result of impact loads from the plates 12 and 14 the bearing surfaces are generally indented downwardly from the crest 44. The length of each bearing surface relative to the thickness T of the plates 12 and 14 is a function of the angle at which the legs 40 are attached. In this embodiment, because the legs 40 are attached at substantially a 90° angle, the length of each bearing surface is $\sqrt{2}T$ and the total length of the bearing surface area is $2\sqrt{2}T$. A bar shaped bridge (such as that of straight bridge 37) going straight across the battery jar 24, perpendicular to the plates 12 and 14, provides a bearing surface (such as that of straight bridge bearing surface 47) of length T only. Thus, the chevron shaped bridges provide a length of bearing area 2√2 times that of a straight bridge-bar. Though, in this embodiment, the pair of legs 40 forms a chevron shaped bridge, it will be clear to one skilled in the art that other shapes may also be formed, e.g., T-shaped, Y-shaped or curved bridges.

Figure 5:
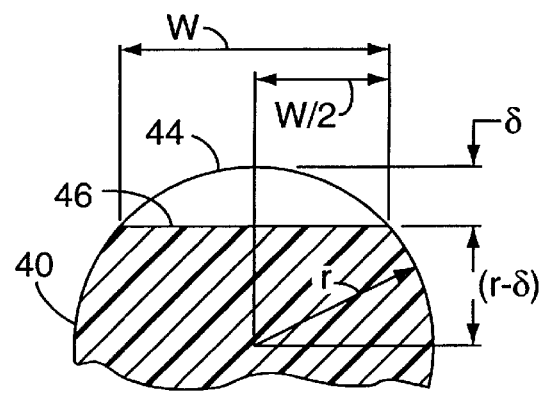
FIG. 5 is a cross-sectional view of FIG. 4 taken along the line 5—5.

Referring to FIG. 5, a cross-sectional view of FIG. 4 taken along the line 5—5 is shown. The crest 44 of each leg 40 has a crest radius r. However, impact loads from the plates 12 and 14 (not shown) tend to indent the crest 44, enlarging the bearing surface 46 until the surface area is large enough to with-stand the impact without further deformation. The bearing surface 46 has an indentation depth $\delta$ and an indentation width w, as shown in FIG. 5.

The plate-support capacity of the crests of bridge members can be approximated as follows: It is assumed that the circular crest of a bridge member remains approximately circular outside of the area that becomes indented by downward force from a plate. Then, as illustrated in FIG. 5, the relationship between indent depth w, and indent depth $\delta$, is $$(w/2)^2 = r^2 - (r-\delta)^2$$

The use of this relationship is simplified by expressing it in terms of the ratios w/r and $\delta$/r as follows:

$$w/r = 2[1-(1\delta/r)^2]^{1/2}$$

Figure 6:
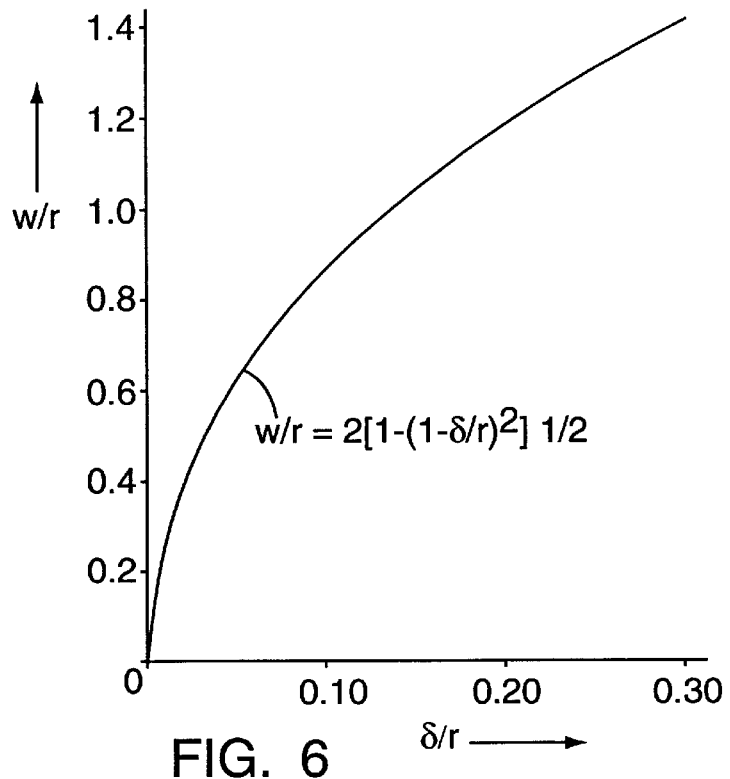
FIG. 6 is a graphical representation of the ratio of indentation width to crest radius and the ratio of indentation depth to crest radius of the bridges in accordance with the invention.

Referring to FIG. 6, the above relationship is expressed in graph form.

Figure 7A:
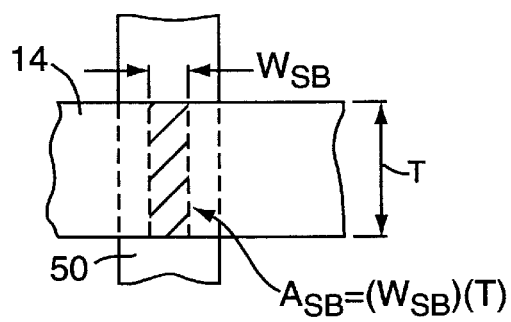
FIG. 7a is a top view of the bearing area of a straight-bar bridge in accordance with the invention.
Figure 7B:
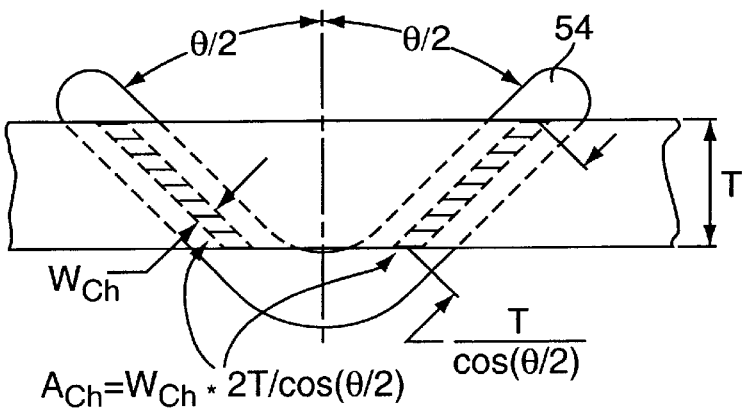
FIG. 7b is a top view of the bearing area of a chevron shaped bridge in accordance with the invention.

Referring to FIGS. 7a and 7b, a plan view of a negative plate 14 bearing on the crest of a straight-bar bridge 50 is shown in FIG. 7a. The bearing area, $A_{SB}$, of the straight-bar bridge is calculated as follows:

$$A_{SB} = (W_{SB})(T) \text{ wherein;}$$

$W_{SB}$ = the width of the indent on a straight-bar bridge; and
T = the thickness of the battery plate.

The bearing area, $A_{Ch}$, for a chevron bridge 54 whose walls have an included angle $\theta$ is shown in FIG. 7b. The bearing area $A_{Ch}$ is calculated as follows:

$$W_{Ch} 2T/(\cos \theta/2) \text{ wherein;}$$

$W_{Ch}$ is the width of the indent on a chevron bridge.

The width of the indent $W_{Ch}$, on the crest of a chevron bridge member 54 as compared with the indent width $W_{SB}$, on the straight-bar bridge member 50 for the same battery plate loads and the same compressive stress in the bridge material, may be calculated as follows: (Assuming the loads and the compressive stress are to be the same for both kinds of bridges, it follows that)

$$A_{Ch} = A_{SB}$$

$$W_{Ch} \cdot 2T/(\cos \theta/2) = W_{SB} \cdot T$$

$$W_{Ch}/W_{SB} = (\cos \theta/2)/2$$

The reduced width of bearing area achieved by a chevron bridge permits a thinner bridge member having a smaller crest radius to be used without increased indenting in support of a battery plate. Alternately, a chevron bridge having the same radius as a straight-bar bridge will have $2/(\cos \theta/2)$ times as much load carrying capacity.

For example, a widely used crest radius, r, on bridges is 0.060 inches. If the indent width, $W_{SB}$, impressed on a straight-bar bridge of this crest radius is 0.060 inches, the ratio of indent width to crest radius is $W_{SB}/r = 0.060/0.060 = 1.00$. From the graph of FIG. 6, the corresponding ratio of indent depth, $\delta$, to create radius, r, is $\delta/r = 0.134$. Therefore $\delta = 0.134 \times 0.060 = 0.008$ inches. A 90° chevron bridge having a 0.060 inch crest radius under the same loading would have an indent width $W_{Ch} = 0.060/2\sqrt{2} = 0.021$ inches and $W_{Ch}/r = 0.021/0.060 = 0.35$. From FIG. 6, the ratio of indent depth, $\delta$, to crest radius, r, would be $\delta/r = 0.0154$. The indent itself would be $\delta = 0.0154 \times 0.060 = 0.000924$, or approximately 0.001 inches.

Since this chevron indent is so small, thinner bridge members with smaller crest radii could be used. For example, if a chevron bridge member 0.080 inches thick at its crest with a crest radius, r, of 0.040 inches were used, the above indent width, $W_{Ch}$, of 0.021 inches would give $W_{Ch}/r = 0.021/0040 = 0.525$. Then by FIG. 6, $\delta/r = 0.0351$ and $\delta = 0.0351 \times 0.040 = 0.0014$ inches. This indent depth is considerably less than the 0.008 inches indent depth for the straight-bar of 0.060 crest radius.

In battery cells using straight-bar bridges with four bars, just two chevron rows can provide the same plate support area. This may be shown as follows:

In the above example of a straight-bar bridge with a crest radius of 0.060 inches, if the bridge has 4-bars, the total indent width for the 4-bars is $4 \times 0.060 = 0.240$ inches. Each of the two chevron rows would need to provide the equivalent of one-half of this total which is $0.240/2 = 0.120$ inches. Due to the chevron form, the indent width for a 90° chevron would need to be $0.120/2\sqrt{2} = 0.042$ inches. If a chevron of 0.094 inches in crest thickness with a crest radius of 0.047 inches were used, the indent width to crest radius ratio would be $0.042/0.047 = 0.894$. The indent depth to crest radius ratio, by FIG. 6, would be 0.105 and the indent depth would be $0.105 \times 0.047 = 0.005$ inches. Thus, in this example, a 2-row 90° chevron bridge having a crest radius of 0.047 inches provides the same support area as a 4-row straight-bar bridge having a crest radius of 0.060 inches. The indent depth is approximately 0.005 inches for the 2-row chevron bridge as compared with 0.008 inches for the 4-row straight-bar bridge.

Figure 8:
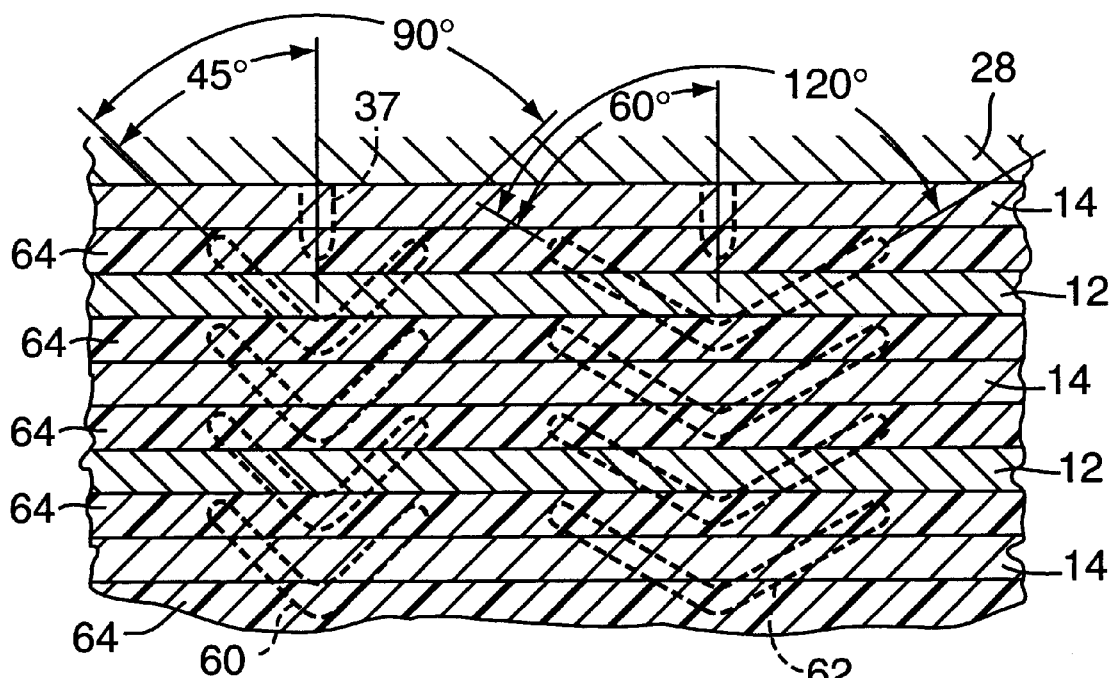
FIG. 8 is a top view of an alternative embodiment of thechevron bridges in accordance with the invention.

Referring to FIG. 8, the length of the chevron crest area available for plate support depends on the angle between the arms of the chevron. In FIG. 7b, the bearing area is shown to be inversely proportional to the cosine of one-half the angle between the arms. This is illustrated in FIG. 8 where a 90° chevron 60 and 120° chevron 62 are displayed.

The chevrons 60 and 62 are shown supporting the alternate negative 14 and positive 12 plates. The positive plates 12 include an insulative wrapping material 64, e.g. fiberglass or plastic, which separates the plates 12 and 14, and prevents them from shorting against each other when stacked within the battery jar 24. The end negative plate 14 is stacked against the battery jar wall 28 and supported by staight bridges 37.

The 120° chevron 62 has a length of bearing area of 4T whereas the 90° chevron 60 has a length of bearing area of 2√2T. It is also evident from FIG. 8 that for the same chevron wall thickness, the mud passage spaces are wider for the 120° chevron 62 than for the 900 chevron 60. However, for higher bridges where buckling stability becomes important, the wider angle chevron will not be as structurally sound. The wider angle chevron also occupies more of the space in which mud can accumulate.

Figure 9:
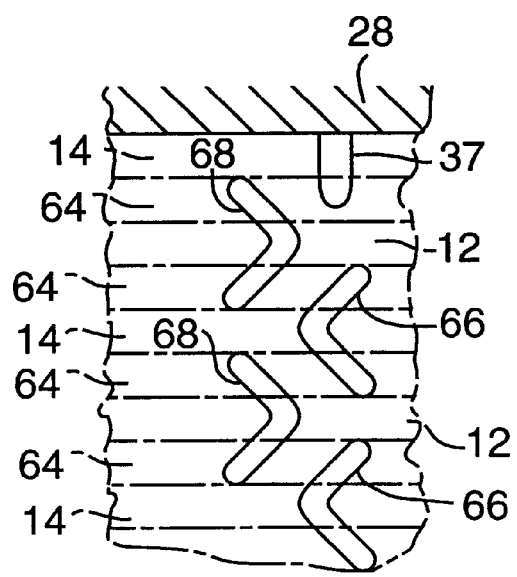
FIG. 9 is another alternative embodiment of the chevron bridges in accordance with the invention.

Referring to FIG. 9, an alternative exemplary embodiment of the invention is illustrated. In this embodiment a first set of angled bridges 66 are oriented 90 degrees clockwise and a second set of angled bridges are oriented 90 degrees counterclockwise from the previous exemplary embodiments. Though this and other embodiments show the bridges disposed in rows, it will be clear to one skilled in the art that other orientations and/or patterns may also be used.

It is preferable to make the included angle between the walls of a chevron in the range of 90° to 120=. However, angles outside this range may be used in some applications.

While preferred embodiments have been shown and described, various modifications and substitutions may be made thereto without departing from the spirit and scope of the invention. Accordingly, it is understood that the present invention has been described by way of illustrations and not limitation.

What is claimed is:

1. A battery jar for receiving a plurality of alternately charged positive and negative plates immersed in an electrolyte, the battery jar comprising:
    a bottom portion having an inside surface;
    a plurality of walls extending upwardly from the periphery of the bottom portion, and
    a plurality of angled bridges disposed on the inside surface of the bottom portion to support the plurality of plates a predetermined distance above the inside surface, the bridges including a pair of legs attached at an angle such that each leg provides structural support for the other when supporting the plates, the pair of legs extending across only a portion of the inside surface and having a pair of bearing surfaces for supporting a plate thereon, each bearing surface substantially located the predetermined distance above the inside surface.

2. The battery jar of claim 1, wherein the structural support for each leg prevents the plates from buckling when impact loads from the plates occur.

3. The battery jar of claim 1, wherein the bridges further comprise a chevron shape.

4. The battery jar of claim 1, wherein the angle of attachment of the legs is substantially within the range of 90 degrees to 120 degrees.

5. The battery jar of claim 1, wherein the plurality of bridges are disposed in sets of parallel rows.

6. The battery jar of claim 1, wherein the battery jar further comprises a molded battery jar and the bridges are integrally molded with the jar.

7. The battery jar of claim 6, wherein the battery jar is comprised of a thermoplastic material.

8. The battery jar of claim 1 further comprising a plurality of straight-bar bridges disposed on the inside surface and extending substantially perpendicular from the walls a distance greater than a thickness of the plates, wherein each straight-bar bridge faces the concave side of the angled bridge closest to it.

9. The battery jar of claim 1, wherein the angled bridges further comprise a crest radius and have substantially 2/(cos θ/2) times as much load carrying capacity as a straight-bar bridge with the same crest radius, θ being a measure of the angle formed by the legs.

10. A battery jar for receiving a plurality of alternately charged positive and negative plates immersed in an electrolyte, the battery jar comprising:
    a bottom portion having an inside surface;
    a plurality of walls extending upwardly from the periphery of the bottom portion; and
    a plurality of plate support bridges disposed on the inside surface of the bottom portion to support the plurality of plates a predetermined distance above the inside surface, the bridges including a pair of legs attached at an angle, the pair of legs extending across only a portion of the inside surface and having a pair of bearing surfaces for supporting a plate thereon, each bearing surface substantially located the predetermined distance above the inside surface.

11. The battery jar of claim 10, wherein the bridges further comprise a chevron shape.

12. The battery jar of claim 10, wherein the angle of attachment of the legs is substantially within the range of 90 degrees to 120 degrees.

13. The battery jar of claim 10, wherein the plurality of bridges are disposed in sets of parallel rows.

14. The battery jar of claim 10, wherein the battery jar is a molded battery jar and the bridges are integrally molded with the jar.

15. The battery jar of claim 14, wherein the battery jar is comprised of a thermoplastic material.

16. The battery jar of claim 10, further comprising a plurality of straight-bar bridges disposed on the inside surface and extending substantially perpendicular from the walls a distance greater than a thickness of the plates, wherein each straight-bar bridge faces the concave side of the angled bridge closest to it.

17. The battery jar of claim 10, wherein the angled bridges further comprise a crest radius and have substantially 2/(cos θ/2) times as much load carrying capacity as a straight-bar bridge with the same crest radius, θ being a measure of the angle formed by the legs.

18. A battery cell comprising:
    a plurality of alternately charged positive and negative plates;
    an electrolyte into which the plates are immersed; and
    a battery jar for receiving the plates and electrolyte, the battery jar including,
        a bottom portion having an inside surface;
        a plurality of walls extending upwardly from the periphery of the bottom portion; and
        a plurality of angled bridges disposed on the inside surface of the bottom portion to support the plurality of plates a predetermined distance above the inside surface, the bridges including a pair of legs attached at an angle such that each leg provides structural support for the other when supporting the plates, the pair of legs extending across only a portion of the inside surface and having a pair of bearing surfaces for supporting a plate thereon, each bearing surface substantially located the predetermined distance above the inside surface.

19. The battery cell of claim 18, wherein the structural support for each leg prevents the plates from buckling when impact loads from the plates occur.

20. The battery cell of claim 18, wherein the bridges further comprise a chevron shape.

21. The battery jar of claim 18, wherein the angle of attachment of the legs is substantially within the range of 90 degrees to 120 degrees.

22. The battery cell of claim 18, wherein the plurality of bridges are disposed in sets of parallel rows.

23. The battery cell of claim 18, wherein the battery jar further comprises a molded battery jar and the bridges are integrally molded with the jar.

24. The battery cell of claim 23, wherein the battery jar is comprised of a thermoplastic material.

25. The battery cell of claim 18 further comprising a plurality of straight-bar bridges disposed on the inside surface and extending substantially perpendicular from the walls a distance greater than a thickness of the plates, wherein each straight-bar bridge faces the concave side of the angled bridge closest to it.

26. The battery cell of claim 18, wherein the angled bridges further comprise a crest radius and have substantially $2/(\cos \theta/2)$ times as much load carrying capacity as a straight-bar bridge with the same crest radius, $\theta$ being a measure of the angle formed by the legs.

27. The battery jar of claim 1, wherein each leg has an acutely angled relationship with the walls of the battery jar.

28. The battery jar of claim 10, wherein each leg has an acutely angled relationship with the walls of the battery jar.

29. The battery cell of claim 18, wherein each leg has an acutely angled relationship with the walls of the battery jar.

* * * * *